United States Patent
Wachtell et al.

(10) Patent No.: US 10,066,434 B2
(45) Date of Patent: Sep. 4, 2018

(54) INSULATED OVERHEAD DOOR

(71) Applicant: COLD CHAIN, LLC, Boise, ID (US)

(72) Inventors: Peter J. Wachtell, Boise, ID (US); Daniel M. Aragon, Meridian, ID (US); John J. Prehn, Boise, ID (US); Todd J. Lindsey, Boise, ID (US)

(73) Assignee: COLD CHAIN, LLC, Boise, ID (US)

( * ) Notice: Subject to any disclaimer, the term of this patent is extended or adjusted under 35 U.S.C. 154(b) by 0 days.

(21) Appl. No.: 14/875,577

(22) Filed: Oct. 5, 2015

(65) Prior Publication Data

US 2016/0024837 A1  Jan. 28, 2016

Related U.S. Application Data

(63) Continuation of application No. 13/585,994, filed on Aug. 15, 2012, now Pat. No. 9,151,084.
(Continued)

(51) Int. Cl.
*E06B 3/48* (2006.01)
*E06B 3/80* (2006.01)
(Continued)

(52) U.S. Cl.
CPC ............. *E06B 3/80* (2013.01); *B32B 5/18* (2013.01); *B32B 27/065* (2013.01); *B32B 27/304* (2013.01); *B32B 27/32* (2013.01); *B60J 5/108* (2013.01); *B60J 5/12* (2013.01); *E05B 81/10* (2013.01); *E05D 15/24* (2013.01); *E05F 15/50* (2015.01); *E05F 15/59* (2015.01); *E05F 15/77* (2015.01); *E06B 3/4407* (2013.01); *E06B 5/00* (2013.01); *G07C 9/00007* (2013.01); *B32B 2262/101* (2013.01); *B32B 2266/025* (2013.01); *B32B 2266/0221* (2013.01); *B32B 2266/06* (2013.01); *B32B 2266/08* (2013.01); *B32B 2307/304* (2013.01); *B32B 2419/00* (2013.01); *E05D 15/16* (2013.01); *E05Y 2900/106* (2013.01); *E05Y 2900/516* (2013.01); *E06B 2003/7044* (2013.01); *E06B 2003/7051* (2013.01); *F25D 23/021* (2013.01); *Y10T 292/11* (2015.04)

(58) Field of Classification Search
CPC ......... F25D 23/021; E05D 15/20; E06B 3/80; E06B 2003/7044; E06B 2003/7049; E06B 2003/7051; E06B 2003/7053
USPC ......... 160/201, 230, 231.1, 231.2, 232, 270, 160/271, DIG. 8
See application file for complete search history.

(56) References Cited

U.S. PATENT DOCUMENTS 2,042,002 A    5/1936  Hovey
2,258,971 A   10/1941  Carlson
(Continued)

OTHER PUBLICATIONS

Author Unknown, Versitex, US Liner Company, http://www.uslco.com/about-versitex.cfm, accessed Mar. 11, 2011, pp. 1-2.

*Primary Examiner* — Katherine W Mitchell
*Assistant Examiner* — Johnnie A. Shablack
(74) *Attorney, Agent, or Firm* — Foley & Lardner LLP

(57) ABSTRACT

An article of manufacture for use as an insulated overhead door that is designed to roll open and closed in tracks, with a sheet of thermoplasitc material that acts as the outer door membrane and barrier to entry, a sheet of insulating material that acts as a base insulating barrier adhered to the thermoplastic membrane.

20 Claims, 2 Drawing Sheets

Related U.S. Application Data

(60) Provisional application No. 61/523,786, filed on Aug. 15, 2011.

(51) Int. Cl.

| | | |
|---|---|---|
| *E05B 81/10* | (2014.01) | |
| *E05F 15/50* | (2015.01) | |
| *E05F 15/59* | (2015.01) | |
| *E05F 15/77* | (2015.01) | |
| *B60J 5/10* | (2006.01) | |
| *B60J 5/12* | (2006.01) | |
| *G07C 9/00* | (2006.01) | |
| *B32B 5/18* | (2006.01) | |
| *B32B 27/06* | (2006.01) | |
| *B32B 27/30* | (2006.01) | |
| *B32B 27/32* | (2006.01) | |
| *E05D 15/24* | (2006.01) | |
| *E06B 3/44* | (2006.01) | |
| *E06B 5/00* | (2006.01) | |
| *F25D 23/02* | (2006.01) | |
| *E05D 15/16* | (2006.01) | |
| *E06B 3/70* | (2006.01) | |

(56) References Cited

U.S. PATENT DOCUMENTS

| | | | |
|---|---|---|---|
| 2,827,118 A | 3/1958 | Wendt | |
| 3,017,218 A | 1/1962 | Groth et al. | |
| 3,084,403 A | 4/1963 | Elmendorf | |
| 3,662,410 A | 5/1972 | Jay | |
| 3,724,526 A | 4/1973 | Huprich | |
| 3,856,072 A | 12/1974 | Sund | |
| 3,967,671 A * | 7/1976 | Stanley | E06B 3/485 |
| | | | 160/201 |
| 4,436,136 A | 3/1984 | Downey, Jr. | |
| 4,445,958 A | 5/1984 | Jaksha | |
| 4,690,862 A | 9/1987 | Hoffman | |
| 5,016,700 A | 5/1991 | Wegner et al. | |
| 5,195,445 A | 3/1993 | Riddles et al. | |
| 5,239,779 A | 8/1993 | DeLand et al. | |
| 5,515,649 A | 5/1996 | Strab | |
| 5,738,161 A | 4/1998 | Martin | |
| 5,915,445 A * | 6/1999 | Rauenbusch | E06B 9/13 |
| | | | 160/230 |
| 6,443,209 B1 | 9/2002 | Hurst | |
| 6,706,370 B1 * | 3/2004 | Ito | B29C 43/203 |
| | | | 156/213 |
| 7,111,661 B2 | 9/2006 | Langenbach et al. | |
| 7,434,520 B2 | 10/2008 | Zupancich et al. | |
| 7,587,984 B2 | 9/2009 | Zupancich et al. | |
| 7,748,172 B2 | 7/2010 | Zupancich et al. | |
| 7,790,076 B2 | 9/2010 | Seiter et al. | |
| 7,866,368 B2 * | 1/2011 | Ostrovsky | E05D 15/165 |
| | | | 160/201 |
| 8,590,244 B2 * | 11/2013 | O'Riordan | E06B 3/485 |
| | | | 160/229.1 |
| 8,839,842 B2 * | 9/2014 | Ashelin | E06B 9/13 |
| | | | 160/330 |
| 9,151,084 B2 * | 10/2015 | Wachtell | E05B 81/10 |
| 9,394,742 B2 * | 7/2016 | Knutson | E06B 9/13 |
| 9,410,363 B2 * | 8/2016 | Knutson | E06B 3/80 |
| 9,631,424 B2 * | 4/2017 | Fischer | E06B 9/13 |
| 2003/0173040 A1 | 9/2003 | Court et al. | |
| 2006/0102295 A1 * | 5/2006 | Leist | E05D 15/16 |
| | | | 160/201 |
| 2006/0108361 A1 | 5/2006 | Seiter | |
| 2008/0110580 A1 | 5/2008 | Hoerner et al. | |
| 2009/0025334 A1 | 1/2009 | Aquilina et al. | |
| 2009/0038247 A1 | 2/2009 | Taylor et al. | |
| 2009/0193716 A1 * | 8/2009 | Magill | B44C 1/18 |
| | | | 49/197 |
| 2010/0058691 A1 | 3/2010 | Mannion | |
| 2010/0132894 A1 * | 6/2010 | Knutson | E06B 9/13 |
| | | | 160/113 |
| 2010/0242372 A1 | 9/2010 | Schram | |
| 2010/0270826 A1 | 10/2010 | Weeda et al. | |
| 2011/0041411 A1 | 2/2011 | Aragon | |
| 2012/0018102 A1 * | 1/2012 | Ungs | E06B 9/13 |
| | | | 160/113 |

* cited by examiner ically claims benefit of U.S. Provisional Application No. 61/523,786, filed Aug. 15, 2011, the disclosure of which is hereby incorporated by reference in its entirety.

INSULATED OVERHEAD DOOR

This application claims benefit of U.S. Provisional Application No. 61/523,786, filed Aug. 15, 2011, the disclosure of which is hereby incorporated by reference in its entirety.

BACKGROUND

This invention relates generally to the field of overhead insulated doors and, more specifically, to an insulated overhead door that is designed to roll open and closed in tracks.

In the cold storage distribution industry, insulated doors of various types are used to cover openings between cold areas and warm areas. Depending upon the locations and use of the opening, the doors may be opened multiple times each day, which can result in increased energy costs for maintaining desired temperatures of cold storage containers. Over time, the industry has developed and used doors with increasing insulating qualities (R-value) and with door opening assistance mechanisms (springs and counter weights) that allow for the door to be quickly opened and closed. The speed with which a door can be opened and closed is important as the more that the door can be kept closed, the more energy is saved from having to cool the cold side of the door, and the better the condition of the material that is being kept cool.

With regard to refrigerated trucks, most outer doors that are used for loading and unloading the interior truck space are made of a series of hinged horizontal metal panels filled with insulating foam material. These sections are hinged together to form a single flexible door unit that is sized to fit the opening to be covered. This single unit with several hinged sections is designed to slide up and down in tracks, with the hinged sections allowing the door to bend such that it can slide up and around a curved track path and be suspended in the tracks directly overhead from the refrigerated interior of the truck.

The current state of insulated overhead truck doors is such that they are heavy (e.g., 500+ lbs.), have a lower R-value than that desired by the shippers, and can require large numbers of hinges and other hardware for their construction. There can be significant costs associated with the regular servicing and maintenance of the hinge hardware. In addition to these drawbacks, because the current doors are made up of several separate panels held together by hinges, painting the truck door or applying the company logos or other advertisements to the back panel of the door can be complicated and expensive due, in part, to the need to align the message across multiple panels so as to be readable when door is in the closed position. If a single panel of the door is damaged and requires replacement, the entire door may need to be cleaned and repainted. Further, the doors often employ complicated gaskets in an attempt to provide an improved seal between each of the panel sections. Even then, the multiple horizontal panel design reduces the thermal performance of the entire door.

Due to the heavy nature of most existing overhead doors, large assistance springs or counter weights are often fitted to the door to enable a driver to open and close the door. The springs and/or counter weights increase the total cost and complicate installation of the doors on the truck. In addition, due to the weight of the door, automated systems for opening and closing these doors have not been commercially successful because they are generally considered to be too slow to be useful.

SUMMARY

One or more of the following advantages may be realized by the doors of the present disclosure: a door with a higher R-value for openings designed to utilize an overhead door that runs on tracks; elimination of horizontal seams in the door that result in air leaks and heat intrusion and cause a reduction of the overall thermal performance of the door; providing an improved, seam free door surface for affixing decals, logos or advertising information; providing a simpler door with fewer parts used for its manufacture than many existing doors and a reduction of maintenance costs; reducing the weight of the door to allow a trailer to carry increased amounts of freight; and providing a door that easily utilizes existing overhead track technologies.

The present disclosure addresses some of the current problems with existing overhead door technology, and in particular, the problems associated with insulated doors used in the cold storage industry, such as on delivery trucks for cold storage distribution. By looking at the existing materials that are used in the current door technology, it was determined that finding a lighter weight solution would be advantageous, and that new closed cell foam insulation material existed that could provide a higher R-value with less weight than existing door panels. In attempting to construct a lighter weight version of an operating door, it was apparent that the hinged door design dictated that the door be cut into discreet sections that could be hinged together so as to allow the door to open and close by traversing along curved tracks, thereby positioning the door out of the way of the driver for loading and unloading the truck.

The inventors of the present disclosure realized that if suitable materials are used, single panel overhead doors can be made that are sufficiently flexible to open and close in curved tracks, as described in detail herein. This would allow for overhead doors having one or more advantages, such as higher R-value for insulation, reduced heat intrusion into a cooled space and reduced weight or elimination of springs and counterweights. Other advantages of the present invention will become apparent from the following descriptions, taken in connection with the accompanying drawings, wherein, by way of illustration and example, an embodiment of the present invention is disclosed.

An embodiment of the present disclosure is directed to an insulated overhead door that is designed to roll open and closed in tracks. The overhead door comprises a thermoplastic membrane. A sheet of insulating material is attached to the thermoplastic membrane, the thermoplastic membrane and insulating material forming a panel. Wheels are attached to the door allowing the door to fit into tracks to guide the opening and closing of the door. The overhead door comprises only a single panel.

Another embodiment of the present disclosure is directed to an overhead door assembly. The overhead door assembly comprises a set of curved tracks. An insulated overhead door is configured to roll open and closed in the tracks. The overhead door comprises a thermoplastic membrane. A sheet of insulating material is attached to the thermoplastic membrane, the thermoplastic membrane and insulating material forming a panel. Wheels are attached to the door allowing the door to fit into tracks to guide the opening and closing of the door. The overhead door comprises only a single panel.

BRIEF DESCRIPTION OF THE DRAWINGS

The drawings constitute a part of this specification and include exemplary embodiments to the invention, which may be embodied in various forms. It is to be understood

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In accordance with an embodiment of the disclosure, there is disclosed an article of manufacture for use as an insulated overhead door that is designed to roll open and closed in curved tracks. The door comprises for example, a single sheet of thermoplastic material that acts as the outer door membrane and barrier to entry. The overhead door can also include a single sheet or multiple sheets of material that can act as a base insulating barrier. The door can also include suitable hardware for allowing the door to fit into tracks so as to guide the opening and closing of the door. For example, the door can comprise blocks to which wheels with bearings may be affixed.

Figure 1:
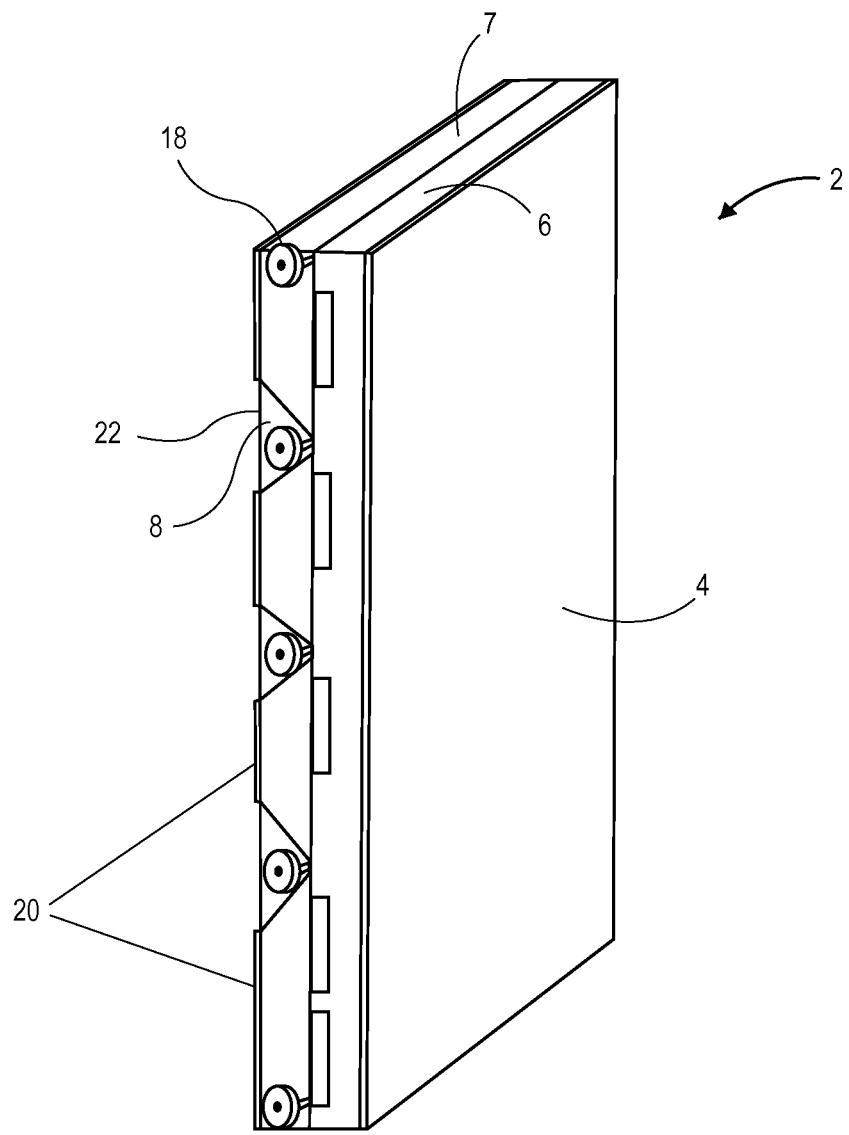
FIG. 1 is a perspective view of an insulated door, according to an embodiment of the present disclosure.

FIG. 1 illustrates an overhead door 2, according to an embodiment of the present disclosure. A thermoplastic membrane 4 can be affixed to an insulating material 6 in any suitable manner so as to form a single panel capable of flexing as it traverses curved tracks. For example, the thermoplastic membrane 4 can be cut or otherwise formed to be approximately the size of the opening to be covered. Insulating material 6 can be affixed to thermoplastic membrane 4 using an adhesive or other fastener. In an embodiment, the fastener can be suitable for cold temperature performance. Suitable techniques for affixing the insulating material to the thermoplastic membrane 4 are well known in the art.

In another embodiment, the thermoplastic membrane 4 can be applied to the insulating material 6 in a liquid form, such as by spraying or coating in any suitable manner. The thermoplastic membrane 4 can then be dried or cured on the insulating material 6. The Insulating material 6 can be cut to size either before or after the thermoplastic membrane 4 is applied.

In an embodiment, the thermoplastic membrane 4 comprises a flexible, durable polymeric material that will protect the insulating material 6 from physical damage and from the elements, including moisture. It can also include other materials, such as fiber glass, to strengthen and/or provide the desired flexibility versus stiffness or other desired properties. Examples of suitable thermoplastic membrane materials include, for example, polypropylene impregnated with glass fibers and laminated together to create a directional structure, such as VERSATEX® VX or VERSATEX VR, both available from US Liner based in Cranberry Township, Pa. Other examples of suitable thermaplastic membrane material include poly vinyl chloride (PVC) combined with rubberizing agents to increase flexibility, which are well known in the art; or polyurea and/or polyurethane applied directly to the foam or any other acceptable substrate, such as the spray on liners available from LINE X Protective Coatings of Huntsville, Ala., or Rhino Linings Corporation of San Diego, Calif.

Examples of insulating materials include foam. Suitable foams can include, for example, closed cell foams, such as ethylene vinyl acetate ("EVA") foam, which is a copolymer of ethylene and vinyl acetate and is available from many sources. The weight percent vinyl acetate may vary, for example, from about 10% to about 40%, based on the total weight of the EVA material, with the remainder being ethylene. Other examples of suitable closed cell foams include polyethylene foams, polypropylene foams or neoprene based foams. Open cell foams, such as polyether based polyurethanes foams or polyester based polyurethane foams, can also be used. All of these listed foams are generally well known in the art.

In an embodiment, solid blocks or any other suitable hardware may be attached to the thermoplastic mambrane to allow for the attachment of wheels 18 (which may or may not include bearings), such that the door may be run in overhead door tracks.

In an embodiment, foam blocks 7, as illustrated in FIG. 1, (such as EVA foam or any other insulating material, including any foam discussed herein) may be adhered to, for example, an initial sheet of foam, such as closed cell foam, that is employed as insulating material 6. In this manner, a door with an increased R-value may be provided. The insulating foam can be bonded together in any suitable manner. Techniques for bonding insulting foam together, such as with adhesives, are well known in the art.

The insulating foam can optionally include compression gaps 8, examples of which are shown in FIG. 1. The compression gaps 8 in the foam material allow the foam to more easily bend during the opening and closing of the door. The compression gaps 8 can be formed between the foam blocks, as illustrated. Alternatively, the compression gaps 8 can be formed partially through a foam sheet, such as where a second foam sheet is used to replace some or all of the foam blocks bonded to the first foam sheet shown in FIG. 1. In yet another embodiment, compression gaps 8 could be formed in the foam sheet illustrated in FIG. 1.

Figure 2A:
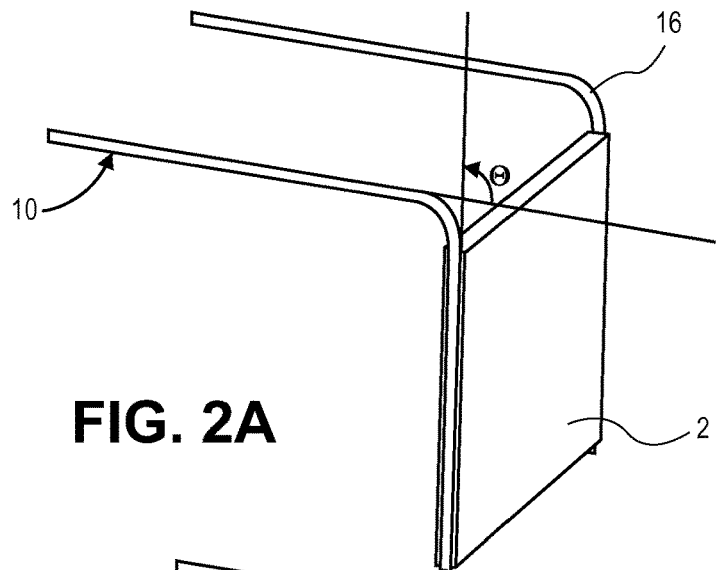
FIGS. 2A to 2C illustrate an insulated door at different positions on a track, according to an embodiment of the present disclosure.
Figure 2B:
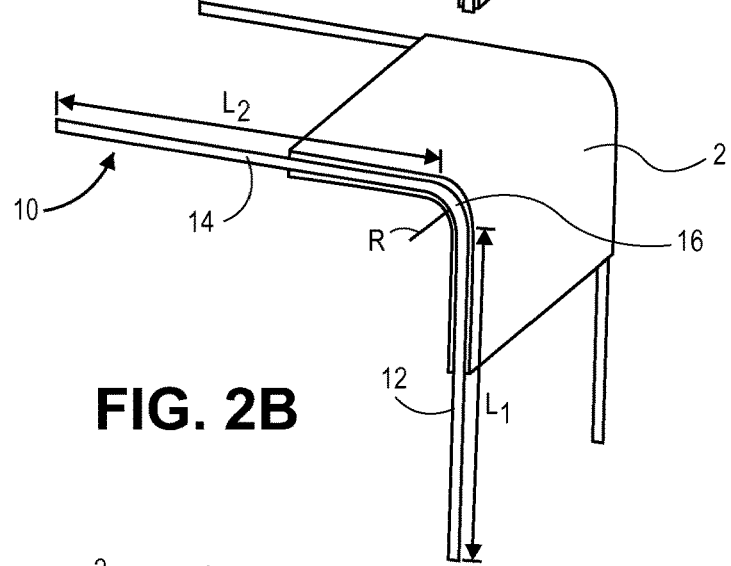
Figure 2C:
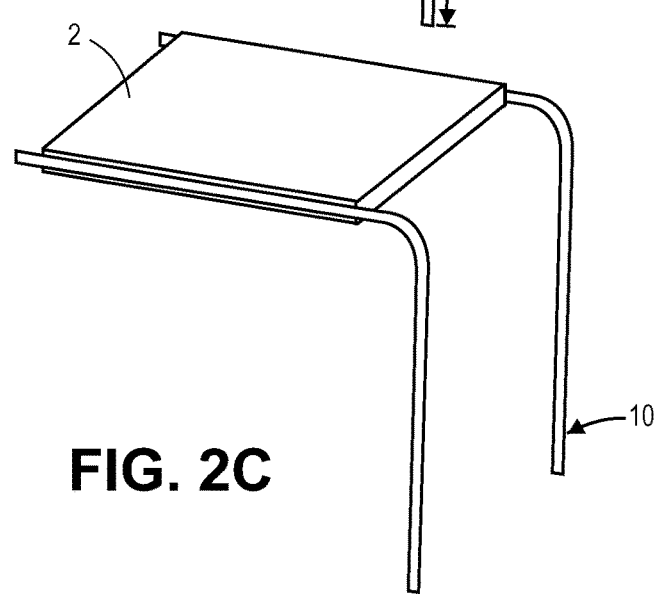

Due to the flexibility of the thermoplastic membrane 4 and foam composite, the doors of the present disclosure can be made as a single integral unit, or panel, that is approximately the size of the door opening, without having to hinge together multiple sections to allow the door to traverse a curved track. In an embodiment, the single laminate door section can flex sufficiently to traverse an existing track. FIGS. 2A to 2B illustrate a door 2 flexing to traverse tracks 10, according to an embodiment of the present disclosure. The tracks 10 can be attached to, for example, a truck or enclosed trailor used for cold storage during transport. Alternatively, the tracks 10 can be attached to a building for which thermally insulated doors are desired, such as might be used for cold storage on a walk-in freezer or refrigerated warehouse, or a garage door.

The tracks 10 comprises a track portion 12 of a first length, $L_1$, positioned at an angle, $\Theta$, relative to track portion 14 of a second length, $L_2$, as shown in FIG. 2A. $\Theta$ can range, for example, from about 80° to about 125°. In an embodiment, $\Theta$ is approximately 90°. In an embodiment, the door is positioned substantially horizontally from a point near the top of the door opening, so that most or all of the door is in a substantially vertical position when closed and most or all of the door is in a substantially horizontal position when open (assuming the truck or refrigerated container the tracks 10 are attached to is positioned on a substantially level surface).

In embodiments, the track portions 12 and 14 can be relatively straight. In alternative embodiments, the track portions 12 and 14 can be somewhat curved.

A third curved track portion 16 connects the first portion 12 and second portion 14. Curved track portion 16 can be curved in any suitable manner that will provide the transition between the relative angles of track portion 12 and track portion 14. The door 2 is designed so that it is capable of flexing to traverse the curved track portion 16. In an embodiment, the portion of door 2 traversing the curve track portion 16 will generally curve to approximate the curved shape of the curved track portion 16. For example, all or a part of track portion 16 can be curved in a circular arc so that the inner path contacted by the wheels has a radius of curvature, R (illustrated in FIG. 2B), where R can range, for example, from about 1 inch to about 25 inches, such as about 5 inches to about 18 inches.

The density of the closed cell foam combined with the thermoplastic liner thickness provides enough stiffness to create a good seal around the edge of the door when the panel is in the closed position, yet may be flexible enough to bend across the horizontal dimension up to, for example, approximately 90 degrees when running through the curved portion of the tracks 10. The flexibility may be increased or decreased by modifying the densities and thicknesses of the foam and liners that are combined such that the panel is able to flex over a very tight radius or a longer radius track curve as a particular door opening and track curvature dictates.

The wheels 18 can be affixed to the door in any suitable manner so that the wheels 18 are positioned to fit into the tracks 10. There are many ways to attach the wheels to the door. For example, the wheels 18 can be mounted using blocks, as discussed above, or brackets. Wheels with sleeves might also be employed to attach the wheels 18 to the door, as is well known in the art.

An optional flexible membrane 20 can also be employed, as illustrated in FIG. 1. The flexible membrane 20 can be made of any suitable flexible material, such as cloth, plastic or rubber sheeting. Optional flexible covers 22 can be employed at the hinge locations, if desired, as is also illustrated in FIG. 1. The flexible covers 22 can also be made of any suitable flexible material, such as those listed for the flexible membrane 20. In an alternative embodiment, the flexible membrane 20 and flexible covers 22 can be a single integral piece of flexible material.

The door can be any desired size or shape. Example door sizes can range from about 6 feet to about 10 feet in width, and about 6 feet to about 12 feet in height. The thickness of the door can be fashioned up to, for example, 12 inches in thickness. Example R values for the door can range from about 14 to about 50. The R value can be increased by increasing the thickness of the door and the amount of EVA foam that is used.

In an embodiment, the door is relatively light weight, so that it can easily be opened and closed by a manual process, or by use of an automatic system, such as, for example, electric, hydraulic or pneumatic systems. These systems can be made to be very efficient at quickly opening and closing doors that are lightweight. Furthermore, the use of these systems may allow the door's opening trigger to be manual or to be automatic based upon the approach of the driver carrying, for example, an RFID transmitter (not shown).

Other alterations or changes to the design of the embodiment of FIG. 1 can also be made. For example, rather than employing insulating foam blocks, as illustrated in FIG. 1, the insulating foam sheet can be employed without the foam blocks, in combination with the sheet of thermoplastic material. Further, the location and number of wheels 18 can also be changed. Still other alterations can be made, as would readily be understood by one of ordinary skill in the art.

While the invention has been described in connection with various detailed embodiments, the description is not intended to limit the scope of the invention to the particular forms set forth herein, but on the contrary, it is intended to cover such alternatives, modifications, and equivalents as may be included within the spirit and scope of the invention as defined by the appended claims.

What is claimed is:

1. A single panel thermally insulated door adapted to transverse curved tracks between a first position entirely blocking a door opening and a second position in which the door opening is not blocked,
   the insulated door having a height, width, and thickness, the door further comprising:
   a core of thermal insulating material, said core being configured and sized to have the same height and width of the height and width of the door and the core is configured and sized to have the same cross-sectional thickness along the height and width of the door;
   a sheet of thermoplastic material affixed to a surface of the core, and coextensive with the height and width of the core, said thermoplastic material acting as an exterior door membrane and barrier to entry; and
   flexible material sheeting affixed to an opposite surface of the core than the sheet of thermoplastic material,
   wherein the sheet of thermoplastic material or the flexible material sheeting has a panel stiffener free outer surface,
   wherein the core of thermal insulating material is configured and sized to contact both the flexible material sheeting and the thermoplastic material along the entire height and width of at least one of the sheet of thermoplastic material and the flexible material sheeting and the door is flexible to approximate the curvature of the curved tracks as the door transverses the curved tracks.

2. The door of claim 1, wherein the door is flexible along its entire height to traverse, and approximate the curvature of, the curved tracks.

3. A single panel flexible door configured to flex when moving between an open position and a closed position, the flexible door having a width, a height, and a thickness comprising:
   a first outer layer having a width, a height and a thickness;
   a core layer connected to the first outer layer, the core layer configured and sized to have the same width and height as the width and height of the of the first outer layer, and the core layer is configured and sized to have a consistent cross-sectional thickness along the width and height of the core layer; and a second outer layer connected to the door, wherein at least one of the first and second outer layers, provide desired flexibility of the door without a panel stiffener contacting the core layer and at least one of the first and second outer layers has a smooth, panel stiffener free outer surface.

4. The single panel flexible door of claim 3, wherein the door is configured to repeatedly flex up to and including 90 degrees.

5. The single panel flexible door of claim 3, wherein the core layer is made of several blocks.

6. The single panel flexible door of claim 3, wherein the core layer includes foam.

7. The single panel flexible door of claim 3, wherein a density of the core layer combined with the thickness of the first outer layer provide an amount of stiffness to create a seal around an edge of the door when the door is in a closed position.

8. The single panel flexible door of claim 3, further including rollers attached to the door.

9. The single panel flexible door of claim 8, wherein the rollers are configured to guide the door along a track and flex the door as the door moves along the track.

10. The single panel flexible door of claim 8, further comprising a block, bracket, or sleeve reinforcing structure located between the core layer and one of the first and second outer layers and the rollers are attached to the reinforcing structure.

11. The single panel flexible door of claim 3, wherein the second outer layer is configured and sized to have the same width, and height as the width and height of the of the first outer layer.

12. The single panel flexible door of claim 11, wherein the first and second outer layers each have an outer surface located on an opposite side of the first and second outer layers than a portion of the first and second outer layers proximate to the core layer and the outer surface of at least one of the first and second outer layer is free of contact with a stiffening member.

13. A single panel flexible door in which the single panel itself is inherently configured to flex as it moves along a curved track between an open and closed position, the flex conforming to the curvature of the track, the door further comprising:
 a first outer layer having a width and a height; and
 a core layer connected to the first outer layer, the core layer is configured and sized to have a same width and height as a width and height of the of the first outer layer, and the core layer is configured and sized to have a same cross-sectional thickness along the width and height of the first outer layer, the core layer configured and sized to contact the first outer layer along the entire height and width of core layer and the first outer layer has a smooth, panel stiffener free outer surface.

14. The single panel flexible door of claim 13, wherein the door is configured to repeatedly flex up to and including 90 degrees.

15. The single panel flexible door of claim 13, wherein a density of the core layer combined with a thickness of the first outer layer provide a desired amount of stiffness without a panel stiffening member contacting the core layer.

16. The single panel flexible door of claim 13, further comprising a second outer layer located on the door on an opposite side of the door as the first outer layer.

17. The single panel flexible door of claim 16, a density of the core layer combined with a thickness of the first outer layer provide a sufficient amount of stiffness to create a seal around an edge of the door when the door is in a closed position.

18. The single panel flexible door of claim 16, wherein the second outer layer is configured and sized to have the same width, and height as the width and height of the core layer.

19. The single panel flexible door of claim 13, further including at least any one of the following: block, bracket or sleeve reinforcing structures attached to at least one of either the first outer layer and the core layer wherein the reinforcing structures provide reinforced areas for attaching wheels to the door.

20. The single panel flexible door of claim 19, wherein the reinforcing structures are located between the outer layer and the core layer.

* * * * *